US006668661B2

(12) United States Patent
Rider

(10) Patent No.: US 6,668,661 B2
(45) Date of Patent: Dec. 30, 2003

(54) PRESSURE DISTRIBUTION IMAGE ANALYSIS PROCESS

(75) Inventor: Cristin Rider, Boston, MA (US)

(73) Assignee: Ram Consulting, Inc., Oak Brook, IL (US)

(*) Notice: Subject to any disclaimer, the term of this patent is extended or adjusted under 35 U.S.C. 154(b) by 0 days.

(21) Appl. No.: 09/805,892

(22) Filed: Mar. 15, 2001

(65) Prior Publication Data

US 2002/0129658 A1 Sep. 19, 2002

(51) Int. Cl.[7] ............................................. G01B 11/16
(52) U.S. Cl. ....................................... 73/762; 73/492
(58) Field of Search ............................. 177/211; 388/2; 117/68; 250/225; 73/762, 715, 492; 346/74.7; 428/437; 399/44; 355/401, 402; 385/106

(56) References Cited

U.S. PATENT DOCUMENTS

| 4,355,692 A | * | 10/1982 | Ostrelich | 177/211 |
| 5,091,743 A | * | 2/1992 | Nagata et al. | 355/30 |
| 5,633,703 A | * | 5/1997 | Takenouchi et al. | 399/315 |
| 6,017,390 A | * | 1/2000 | Charych et al. | 117/68 |
| 6,183,933 B1 | * | 2/2001 | Ishikawa et al. | 430/256 |

OTHER PUBLICATIONS

FujiFilm Instruction Manual for Pressure Measuring Film, published Feb.1999.

* cited by examiner

Primary Examiner—Edward Lefkowitz
Assistant Examiner—Octavia Davis
(74) Attorney, Agent, or Firm—Finnegan, Henderson, Farabow, Garrett & Dunner, L.L.P.

(57) ABSTRACT

A method of analyzing force on a surface is described including providing a pressure-sensitive medium, applying the force to the medium, determining any change in the medium as a result of the applied force, correlating the change in the medium with a pressure value, and analyzing the force value. The pressure-sensitive film may be scanned, each shade or color on the film assigned a pixel value corresponding with pressure values, and the total pixel area values measured to determine pressure characteristics, such as average pressure or total pressure area.

13 Claims, 2 Drawing Sheets

PRESSURE DISTRIBUTION IMAGE ANALYSIS PROCESS

BACKGROUND OF THE INVENTION

The present invention relates to analysis of force. More particularly, the present invention relates to methods for analyzing pressure distribution of a static or kinetic force.

DESCRIPTION OF RELATED ART

In many fields of material testing, it is imperative to determine how a force is applied and distributed over the surface of a body. Determining such characteristics of a force enables a scientist in the field to alter the properties of the body. For example, a scientist may strengthen a material to enable the material to better withstand force. By example, in testing athletic shoes for impact resistance, the type and magnitude of force applied during the testing, such as constant impact force encountered by a running shoe, should be accurate and reflective of the actual forces encountered during actual use of these shoes. Similarly, testing the resistance of automobile doors to particular types of physical impact requires an accurate measure of the magnitude of the forces causing impact.

Conventional methods and means for measuring impact and constant static forces on a surface do not accurately reflect actual forces received by the surface, and moreover are particular to a single type of surface.

A need exists for a simple, economic, and accurate method to determine the magnitudes of forces applied to any type of surface. The method should preferably be universal so that it may be applied to all types of surfaces and able to measure any type of impact or static force.

SUMMARY OF THE INVENTION

Accordingly, the present invention is directed to methods that substantially obviate one or more of the problems due to limitations and disadvantages of the related art. The present invention is designed to detect pressure or pressure distribution imposed on an object or area.

To achieve these and other advantages and in accordance with the purposes of the invention, as embodied and broadly described, the invention includes a method of analyzing a force by providing a pressure-sensitive medium, applying the force to the medium, determining any change in the medium as a result of the applied force, correlating the change in the medium with a pressure value, and analyzing the pressure value.

Additional features and advantages of the invention will be set forth in the description which follows, and in part will be apparent from the description, or may be learned by practice of the invention. The objectives and other advantages of the invention will be realized and attained by the methods particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate preferred embodiments of the invention and, together with the description, serve to explain the objects, advantages, and principles of the invention. In the drawings.

DETAILED DESCRIPTION OF PREFERRED EMBODIMENTS

Figure 1:
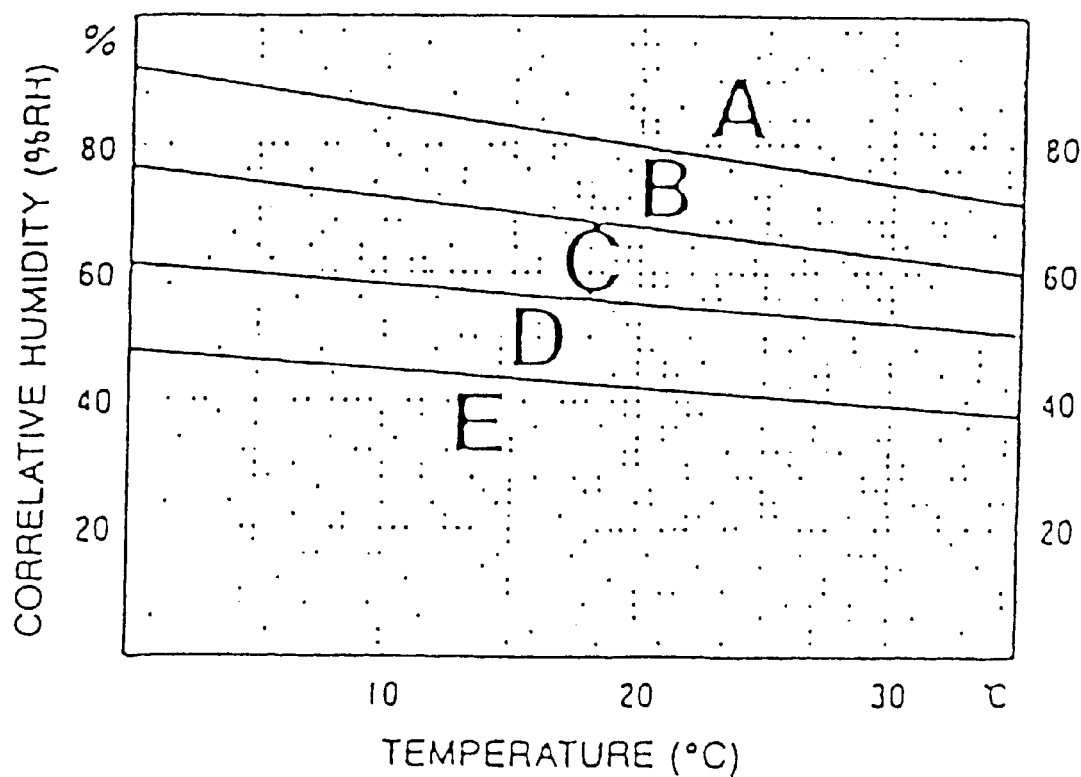
FIG. 1 is a correlation graph of temperature and humidity for a type of film.

The process of the present invention allows for an analysis of pressure distribution from any type of force, including applied static or kinetic forces. These forces may be either impact or constant static forces. Through the analysis, an area of contact, a total applied force, an average pressure, a maximum pressure, and an area of each pressure range may be determined. The process utilizes a pressure sensitive material, such as film, to record the pressure of contact and a shade/color detecting software to measure the recorded pressure from the film. For example, a preferred pressure sensitive film is Fuji Prescale Pressure film, and a preferred analysis software package is Mira Pro Software ("MIRA"), both of which are commercially available.

Any type of material also may be used in the method of the present invention as long as the material can change in appearance or texture according to an applied pressure, and the change may be observed, detected, or measured. The examples of the method of the present invention will be described using Fuji Prescale Pressure Measuring Film ("Fuji film"), described in Fuji Film Imaging & Information Instruction Manual for this film, which is incorporated herein by reference in its entirety. It must be noted, however, that the method of the present invention is not limited to this type of material. A brief review of the Fuji film is made here. Fuji film for low, super low, and ultra super low pressure is typically composed of two sheets of film, defined as an "A film" and a "C film", that are in contact with each other. The A film is covered with microcapsules of a color forming chemical, as is well known in the art. The C film is coated with a color developer layer. Prior to the application of force, the two films are placed on top of each other so that the capsule-coated side of the A film contacts the developer-coated side of the C film. When pressure is applied on any of the exterior sides of this dual-layer film, the microcapsules on the A film break and a stored chemical is released, thereby dying the developer on the C film. The C film is, for example, dyed red in this reaction. The intensity, or the darkness, of the color is related to the pressure applied at that point. A color scale is provided with the film that identifies color intensity, and a graph is provided to relate color density to pressure. Other colors are also possible and may be dependent on the film. For example, another material that may be used to detect and measure pressure, Pressurex-Micro mats, change to different shades of gray with application of force thereupon.

Other types of material may also be used in this invention, as long as they react to pressure in a detectable manner. For example, Pressurex-Micro mats also may be used for pressure distribution assessments. These mats are similar to the Fuji film described above. These mats typically use a carbon paper layer and a sticker layer, rather than the die and chemical system of the Fuji film.

The analysis software may be any software package designed for numerical and graphical analysis of images, such as for example, digital images. As a non-limiting preferred example and as used in the examples below, Mira Pro software, which was originally used for analyzing astronomy CCD images, is used to determine force distribution on the film surface. However, any other software program capable of analyzing images also may be used.

By scanning the color density chart and using the software, a distribution of pixel values for the color intensity is determined. One preferred feature of the software program, available on the Mira Pro software, is a "Palette Manager". The Palette Manager allows for pseudo color palettes to be applied to an image. The pseudo color palette maps pixel values to an assigned color. Therefore, a special palette was created that maps the pixel value distribution associated with the color intensity to a defined color. This allows for the assignment of each set pressure range with a defined color.

Consequently, the image can be scanned in as a gray scale, and then have the palette applied so that each pressure range has a different assigned color according to a pre-determined pixel value for each range. With the image, the total number of pixels that compose each color can be determined using a histogram function of the software. Once the number of pixels that represent each color is determined, an area of contact can be calculated for each pressure value by adding up the total pixel areas that correspond to that pre-determined color. Using this method of counting pixel areas having the same value or color, further analysis of the characteristics of the pressure may be made. Some of the analysis that may be made include calculation of total force by counting up all the pixel values, average pressure by counting up all the pixel values per given area and dividing the total pressure value by a total pixel area for all the measured pressures, maximum pressure by determining the highest level pixel value in a scanned image, an area for each value of pressure in a pressure range as described above, and other similar measurements as known in the art. This numerical analysis approach to determining pressure values on a pressure-sensitive film by assigning pixel values to specific pressure values on a scanned image of the film decreases the error and guesswork associated with the conventional qualitative analysis of observing the change in a pressure-sensitive medium and manually measuring and estimating pressure values from observed changes.

Temperature and humidity also affect the color intensity on the pressure-sensitive film, such as the Fuji film. Thus, temperature and humidity also are factored in when determining the pressure magnitude and distribution on a surface.

This process has been found useful in understanding the pressure and the distribution of that pressure, associated with certain impacts. In addition, this process is used to compare the pressure distribution on human appendages, such as fingers, and objects, such as tubular necks, caused by different types of cord, with varying degrees of texture and thickness, to which a tension is applied. This method is also useful in comparing the deformability of substances, such as comparing animal eyes to model eyes. The pressure distribution varies, for a given application of force, based on the deformation of a target.

Producing an Image

To make an image of a force, the operator must first choose a film that will best measure the applied force. For example, if the applied forces are estimated to be high, a film designed to measure high forces should be chosen. If the forces are estimated to be low, then a more sensitive film designed to measure low forces should be chosen, such as, for example, Fuji Low Pressure film. Next, a relatively same size cut of A film and C film are made. In general, larger pieces of film are preferred over smaller pieces because there tends to be less crumpling with the larger pieces. Each of the A film and C film have a rough side, which has its active components as described above, and a smooth side, which is typically an inert surface. The A film and C film are then placed such that each film's rough side is in contact with the counterpart film's rough side. This way, the active components of each of the films are in contact. The A film and C film, now in close contact with each other, may be adhered at the corners by suitable means if the measured force is expected to be a shear force to ensure prevention of relative movement of one film with respect to the other. If the combined films may possibly move during the application of force, then using a suitable means to adhere the films to the surface of the test material is necessary. Adhesion means used on the film may include standard tapes, such as a small piece of scotch or masking tape. Typically, silicone is not used as the adhesive because of its tendency to do degrade the film.

Once the combined films are in place over a surface, ambient temperature and relative humidity are measured and recorded. Test measurements are most accurate when the humidity does not fall outside of the range of 35% to 80% humidity. Force is then applied. After the application of force, the films are separated and the A film is disposed while the C film is further analyzed.

It should be noted that care should be given such that the films are not placed into contact with moisture. Moisture affects the color distribution on the films, and may produce inaccurate results. Furthermore, prolonged contact of the C film with silicone will ruin the film, even after the film has already been used to measure a force. Placing the C film in contact with or even in the same container as silicone will degrade the image.

Acquiring an Image

After an image has been produced, the image is captured onto a computer by using a scanner, and a software program, such as Pressurex-Mirco. The Pressurex-Micro Micro typically is used to acquire and process images from Pressurex Micro mats. The scanner interface portion of this software is used to scan the Fuji film and save it as a bitmap file. Other scanners and software programs also may be used. Using the scanner, the shiny side of the A film obtained from the previous section is placed upward. When the scanner door is opened, a menu appears. This menu should be closed. The scanner should then be opened. From the File menu, "acquire image" is chosen, which results in a new menu. Next, "Enhance Tab" is chosen with the following parameters preset: Brightness at 13; Contrast at 16; and Gamma at 1. Then, at the Main Tab, the settings must be: Scan Mode at Gray; Scan Source at reflective; and Scaling at 100%. Next, the Prescan button is clicked. After the image loads, the mouse is used to highlight an area to be scanned. Once a scan resolution is selected, the Scan button is pressed. After the image is scanned, the image will appear on the scanner screen and an acquire image screen will disappear. Next, the image is saved. The above steps are repeated to acquire more images through scanning.

Analyzing an Image

Figure 2:
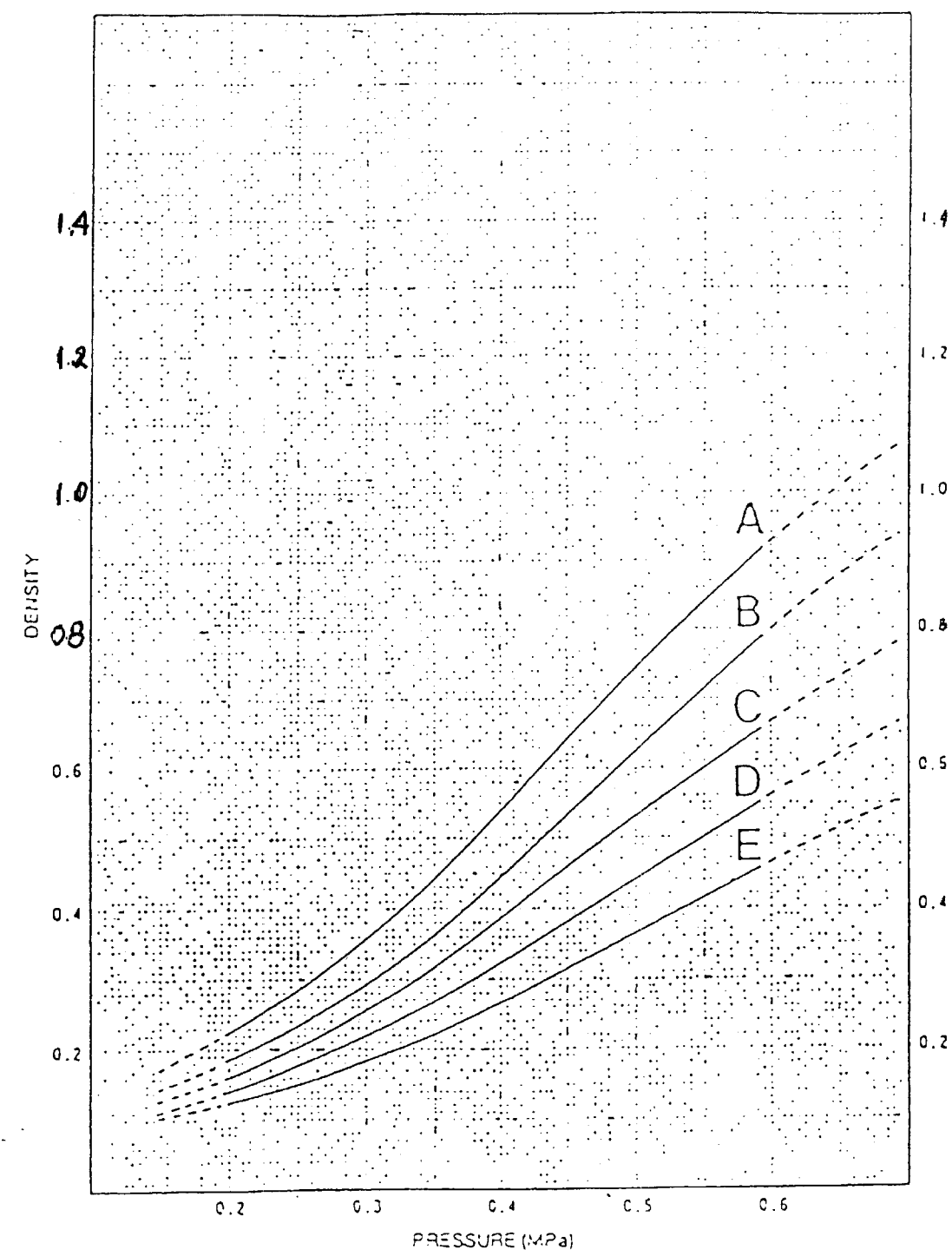
FIG. 2 is a graph of color density correlation to pressure for a type of film.

The acquired images are then analyzed using suitable analysis software, preferably MIRA. According to the measured temperature and humidity values, a pressure chart is consulted, such as in FIG. 1. For example, a room temperature of 25 degrees Celsius and a relative humidity of 60% results in an intersection in area C of FIG. 1. Depending on different combinations of temperature and relative humidity, any of areas A, B, C, D, or E may be used to signify any of curves A–E, respectively, in FIG. 2. For example, for an intersection of temperature and humidity that falls within area C of FIG. 1, curve C is then followed in the pressure chart, FIG. 2. In FIG. 2, curve C correlates certain measured color/shading density values (y axis) with a given pressure value in MPa (x axis). The density values are given a particular representative color. The MIRA software allows for a measurement of the number of pixels at each density value. This produces various resultant values such as overall pressure distribution, maximum and average pressures per given area, area for particular pressures, and other resultant values known to one of ordinary skill in the art.

The method of the present invention enables a user to obtain closer measurements of actual forces on an object than conventional methods. This closer measurement is attributable to the automated correlation of shading patterns on a pressure-sensitive film to a preset pressure scale using a suitable correlation software, such as MIRA. The software automatically correlates the differences in color or shading in a force-contacted film with its saved "palette" of pressure forces and enables the user to automatically obtain characteristic properties of the force imposed upon the force-contacted contacted film. For example, the total area of each gradient of force, represented by a different shade or color, may be obtained by measuring the total area of all pixels having a specifically assigned pseudo color pixel value. Force per unit area may then be easily obtained by measuring the total force, as measured by the addition of all forces of a given magnitude multiplied by the areas on which they are imposed, and dividing the total force x area by the overall area of all forces combined, or in other words, the total area where force measurements were observed. The result is an average force imposed on the surface. In a similar fashion, other measurements, such as average force per unit area, total force, distribution of forces of specific magnitudes, and the area upon which they act, may be obtained by the method of measuring pixels as described above, or by a suitable software program, such as MIRA. This automation of pressure film measurement and analysis increases the accuracy of the force analysis on a given surface by allowing software with preset scale parameters to determine shading or coloring patterns rather than have human determination of such patterns. This automation decreases the possibility of human error and increases accuracy and reliability of force analysis.

The method of the present invention is universal so that it may be used to analyze force distribution in a variety of fields. The universal nature of this method is attributable to its low cost and simple use. The pressure sensitive film may be cut into any configuration and placed on virtually any surface with an appropriate adhesive. The analysis software may easily be preset with the prescale shading and color charts provided by the film manufacturer. Thus, to obtain an accurate and reliable analysis of force on virtually any surface, all that is required is pressure sensitive film, a scanner, and means to run analysis software, such as a laptop computer. The film may be configured to virtually any shape and may be adhered to surfaces using suitable adhesion means, such as a conventional tape. The film also can measure any type of force, whether a static force, such as a pressure force, or a dynamic force, such as a shear force, or an impact force. Thus, the method of the present invention allows operators to test forces on surfaces "in the field" rather than having to set up elaborate testing facilities in a laboratory. The universality of use of the method of this invention is highly cost-effective for all types of force-testing research and development environments.

Although the invention has been described with respect to the preferred embodiments shown, other embodiments also are possible and within the scope of this invention. For example, different films and different software packages may be used other than the ones described here. Changes to the system described above are possible without detracting from the teachings disclosed herein.

What is claimed is:

1. A method of calculating a force comprising the steps of:

providing a pressure-sensitive color-changing film;

applying the force to the film;

measuring temperature and humidity ambient to the film;

determining a visual color change in the film as a result of the applied obtaining a pressure value corresponding to the visual color change by correlating the visual color change in the film with the pressure value, including factoring in effects of the measured ambient temperature and humidity on the change in the film;

analyzing the pressure value; and calculating an amount of the force applied to the film based on the analyzed pressure value.

2. The method of claim 1, wherein the step of applying a force comprises applying a static force.

3. The method of claim 2, wherein the step of applying a static force comprises applying a pressure force.

4. The method claim 1, wherein the step of applying a force comprises applying a dynamic force.

5. The method of claim 4, wherein the step of applying a dynamic force comprises applying a shear force.

6. The method of claim 1, wherein the step of applying a force comprises applying an impact force.

7. The method of claim 1, wherein the step of providing a film comprises providing a film having multiple layers.

8. The method of claim 7, wherein the step of providing a multiple-layer film comprises providing a color developer layer.

9. The method of claim 7, wherein the step of providing at least one layer of film comprises providing a color forming chemical.

10. The method of claim 1, further comprising:

scanning an image of the color change in the film;

assigning pixel values to each pre-determined level of color change in the film; and measuring a total area of pixel values at each pre-determined level of change in the film to obtain a list of pre-determined levels of change and corresponding pixel area values.

11. The method of claim 1, wherein the step of calculating the amount of the force comprises:

measuring a surface area of the film corresponding to each color change;

correlating each color change with a pressure value; and calculating a distribution of forces per unit area by dividing each pressure value by the measured color change surface area.

12. The method of claim 11, wherein the step of calculating the amount of the force further comprises:
   summing the distribution of forces to obtain a total force;
   summing all color change surface areas to obtain a total color change surface area; and
   dividing the total force by the total color change surface area to obtain an average force per unit area.

13. The method of claim 12, further comprising:
   factoring in the effects of the measured ambient temperature and humidity on the determined color change in the film before the average force per unit area is determined.

* * * * *

UNITED STATES PATENT AND TRADEMARK OFFICE
CERTIFICATE OF CORRECTION

PATENT NO. : 6,668,661 B2
DATED : December 30, 2003
INVENTOR(S) : Cristin Rider

It is certified that error appears in the above-identified patent and that said Letters Patent is hereby corrected as shown below:

<u>Column 6,</u>
Line 21, insert -- force; -- after "the applied".

Signed and Sealed this

Sixteenth Day of March, 2004

JON W. DUDAS
*Acting Director of the United States Patent and Trademark Office*